(12) United States Patent
Herrick

(10) Patent No.: US 10,959,421 B2
(45) Date of Patent: Mar. 30, 2021

(54) ANIMAL NOISE SIMULATOR

(71) Applicant: Scott Herrick, Penacook, NH (US)

(72) Inventor: Scott Herrick, Penacook, NH (US)

( * ) Notice: Subject to any disclaimer, the term of this patent is extended or adjusted under 35 U.S.C. 154(b) by 228 days.

(21) Appl. No.: 15/938,711

(22) Filed: Mar. 28, 2018

(65) Prior Publication Data

US 2019/0297871 A1    Oct. 3, 2019

(51) Int. Cl.
*A01M 31/00* (2006.01)
*A01M 31/06* (2006.01)

(52) U.S. Cl.
CPC ........ *A01M 31/004* (2013.01); *A01M 31/008* (2013.01); *A01M 31/06* (2013.01)

(58) Field of Classification Search
CPC .. A01M 31/06; A01M 31/004; A01M 31/008; A01M 31/04; A01M 31/00; A01M 31/002
USPC .......... 43/2, 3; 446/397, 404, 418, 268, 297, 446/298, 330, 336, 352, 353
See application file for complete search history.

(56) References Cited

U.S. PATENT DOCUMENTS

| 5,029,408 | A |   | 7/1991  | Smith |             |
|-----------|---|---|---------|-------|-------------|
| 5,429,271 | A | * | 7/1995  | Porter | A01M 1/2077 |
|           |   |   |         |        | 222/146.5 |
| 5,555,664 | A |   | 9/1996  | Shockley |          |
| 5,961,367 | A | * | 10/1999 | Morris | A01M 31/004 |
|           |   |   |         |        | 401/84 |
| 6,003,261 | A | * | 12/1999 | French | A01M 31/04 |
|           |   |   |         |        | 43/1 |
| 6,289,626 | B1 |   | 9/2001  | Williams |          |
| 6,872,118 | B1 | * | 3/2005  | Bishop | A01M 31/004 |
|           |   |   |         |        | 446/176 |
| 6,889,466 | B1 | * | 5/2005  | Hamlet | A01M 31/004 |
|           |   |   |         |        | 43/2 |
| 6,901,693 | B1 | * | 6/2005  | Crowe | A01M 31/06 |
|           |   |   |         |        | 43/2 |
| 7,029,362 | B1 | * | 4/2006  | Halstead | A01M 31/004 |
|           |   |   |         |        | 446/397 |
| 7,438,624 | B2 | * | 10/2008 | Halstead | A01M 31/004 |
|           |   |   |         |        | 446/397 |
| 10,327,437 | B1 | * | 6/2019 | Allen | A01M 31/004 |
| 2003/0200694 | A1 |  | 10/2003 | Burrison |        |
| 2004/0243263 | A1 |  | 12/2004 | Gardner et al. |  |
| 2006/0154561 | A1 | * | 7/2006 | Halstead | A01M 31/004 |
|           |   |   |         |        | 446/397 |
| 2007/0232187 | A1 |  | 10/2007 | Halstead |       |
| 2010/0050494 | A1 |  | 3/2010  | Zampetis et al. |  |
| 2013/0225039 | A1 |  | 8/2013  | Castner |       |

(Continued)

FOREIGN PATENT DOCUMENTS

CN         2449698        9/2001
DE   10 2007 045 928     4/2009

*Primary Examiner* — Darren W Ark
*Assistant Examiner* — Kevin M Dennis
(74) *Attorney, Agent, or Firm* — Lambert Shortell & Connaughton; David J. Connaughton, Jr.; Gary E. Lambert

(57) ABSTRACT

A noise-making device is provided. The noise-making device has a body, supporting legs, and a striker configured to, upon contact with the ground, create a noise similar to an animal footstep. In use, the noise created by the striker may draw the attention of animals, bringing them in position for observation, tracking, and/or hunting, among other uses. Additional optional features may be used in addition to the noise created to enhance the operability, such as visual and scent features.

18 Claims, 7 Drawing Sheets

(56) References Cited

U.S. PATENT DOCUMENTS

| | | |
|---|---|---|
| 2014/0123538 A1 | 5/2014 | Matheson |
| 2015/0096500 A1* | 4/2015 | McCain .............. A01M 31/002 |
| | | 119/719 |
| 2018/0279579 A1* | 10/2018 | Alcoser ................... H02S 20/20 |
| 2018/0325099 A1* | 11/2018 | Noe .................... A01M 31/004 |
| 2019/0008139 A1* | 1/2019 | Wyant ................... A01M 31/06 |

* cited by examiner

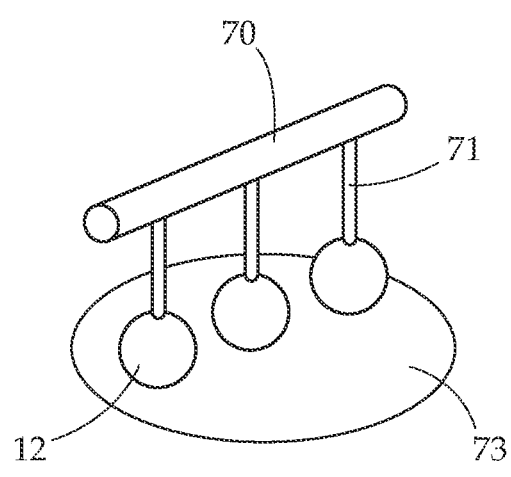
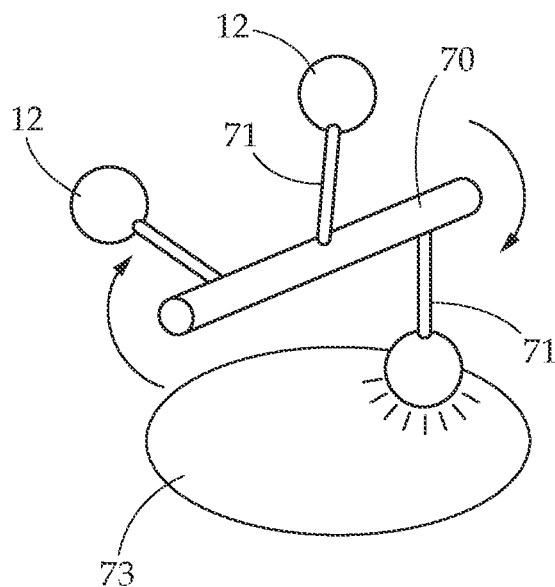
Fig. 7A
Fig. 7B
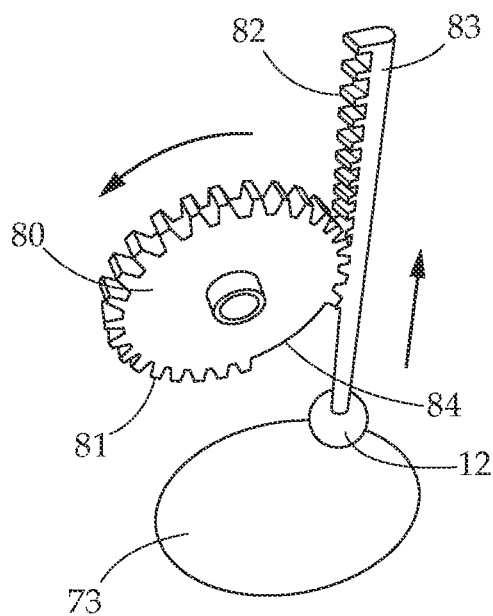
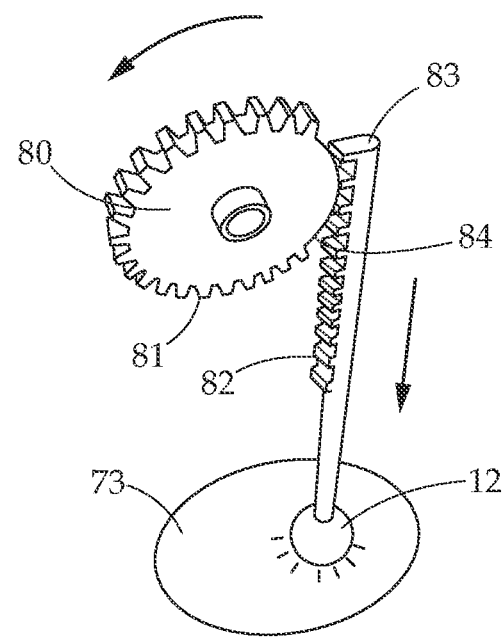
Fig. 8A
Fig. 8B

ANIMAL NOISE SIMULATOR

BACKGROUND OF THE INVENTION

Field of the Invention

The present disclosure relates generally to a hunting or tracking device configured to simulate the sounds of animals, such as sounds of stepping or stomping on the ground.

Description of Related Art

When hunting, tracking, and/or observing animals, often decoys such as visual, scent, or audible calls may attract the animal or animals. However, most of these decoys have significant shortcomings such as requiring manual actuation. This manual actuation has downsides based on the fact that the presence of a human often will scare or otherwise deter the animals, regardless of the attractiveness of the decoy.

Therefore, what is needed is a device that may remotely draw animals so that a user can be away from the device.

SUMMARY OF THE INVENTION

The subject matter of this application may involve, in some cases, interrelated products, alternative solutions to a particular problem, and/or a plurality of different uses of a single system or article.

In one aspect, a noise-making device is provided. The device is designed and configured to mimic the sound of animal steps by impacting the ground in a way similar to an animal's steps. The device comprises a body with a plurality of legs depending from the body. A striker is connected indirectly to the body and is configured to impact a surface on which the legs are on. The striker is movable between a retracted position above the surface and an extended position at or beyond the surface. A motor controls the movement of the striker between the extended and retracted position, and an impact of the striker on the surface creates the noise mimicking the animal noises. It is to be noted that often, the device of the present invention may be positioned on an uneven surface, and therefore the striking position of the striker at the extended position may be at a position closer to, equal to, or further away from a distal end of one or more of the legs.

In another aspect, a noise-making system is provided. The system includes a noise-making device and a remote controller. The noise-making device is formed of a body and a plurality of legs depending from the body. The striker is movable between a retracted position above a distal end of the legs and an extended position at or beyond the distal end of the legs. A motor controls the movement of the striker between the extended and retracted position, and an impact of the striker on the surface creates the primary noise of the noise-making system. The remote controller is in communication, such as wireless communication, with the device. The controller is operable to activate the motor which in turn activates the noise-making by the strikers.

BRIEF DESCRIPTION OF THE DRAWINGS

FIG. 7A provides a view of an embodiment of striker operation of the present invention.

FIG. 7B provides a view of an embodiment of striker operation of the present invention.

FIG. 8A provides a view of another embodiment of striker operation of the present invention.

FIG. 8B provides a view of another embodiment of striker operation of the present invention.

DETAILED DESCRIPTION

Figure 1:
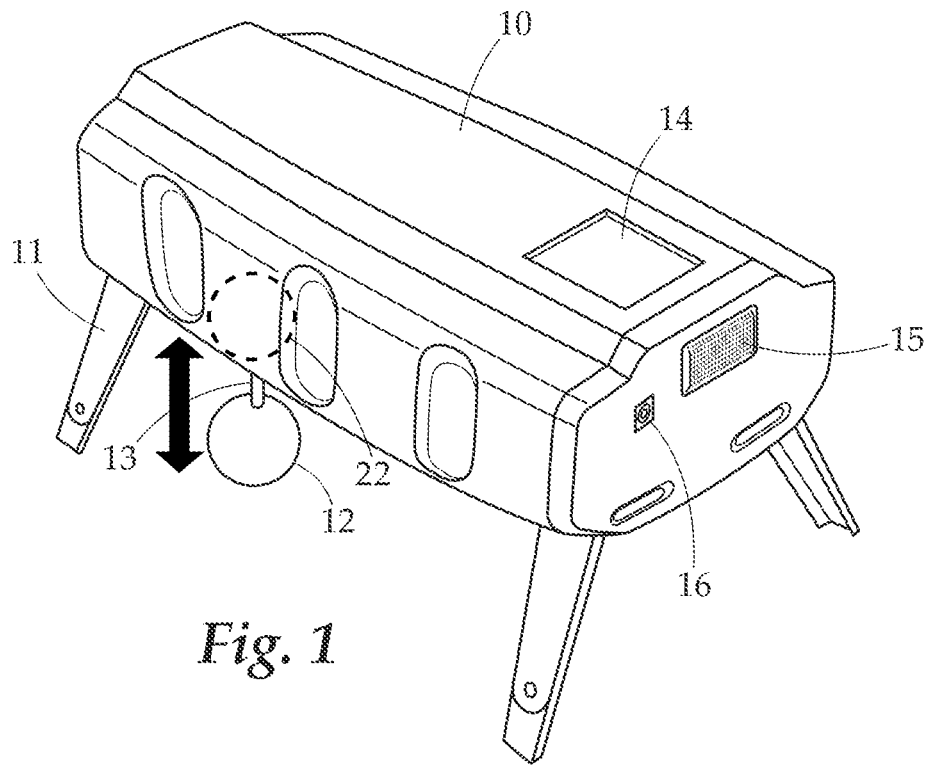
FIG. 1 provides a perspective view of an embodiment of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present disclosure concerns an animal noise-producing device configured to attract animals for hunting, tracking, observation, and the like. The device is formed generally of a body, legs elevating the body from the surface on which it is placed, and a noise-making striker which is configured to impact the surface. In most embodiments, a rotational motor, linear motor, or other drive structure operates to move the striker to cause it to impact ("thump") the ground. A power source such as a battery, solar panels, and the like operates to power the drive structure. In other embodiments, the power source may be a mechanical power source such as a wind-up mechanical power source. This winding power source may load energy into a spring or weight system, or may be used to charge a battery. The device is capable of being automated and controlled by a remote controller, such that it may be placed at a remote location from where a hunter or observer is. The noise created by the noise-making striker attracts animals, for example deer. In many embodiments, the noise-making device operates to call animals to it. Depending on embodiment, the striker's structure, pattern of impact, and force of impact is adjustable to attract differing types of animals. In a particular embodiment, the strikers may be replaceable and/or interchangeable depending on the animal to be attracted. Larger or smaller, heavier, or lighter strikers may be used, as well as strikers of different shape and material, depending on conditions of the device location, desired animal, time of year, weather, and the like. The noise-making device is designed for outdoor use, and therefore is typically waterproof or at least water resistant, lightweight, and durable enough for repeated and extended outdoor exposures.

The term motor is used herein to refer to any drive structure capable of providing the desired motion of the strikers. The motor may be a rotational motor, linear motor, and the like. The motor may typically be powered by electricity, but may use any source of energy without straying from the scope of the invention. Further, the motor, as contemplated herein may utilize mechanics, hydraulics, pneumatics, electro-mechanical structures, and the like without straying from the present invention. As understood in the art, the motor may be any number of different structures while still achieving the required motion of the striker between retracted and extended positions.

The body of the noise-making device may be any structure capable of supporting the device components and optionally housing some or all of these components. In a particular embodiment, the body may house the motor, power source, and the striker or strikers in a retracted position. Other components of the device may be housed within the body or positioned or connected to the body. In embodiments which house the striker in the retracted position, the body may have an opening allowing the striker to move between the retracted and extended position to impact the ground. While the term impact is used to discuss the operation of the strikers, it should be understood that other noise-making motions by the striker may be used, such as a sweeping, a twisting/grinding, rubbing, and the like.

In one embodiment, one or more legs (hereinafter "legs") may depend from a bottom of the body. The legs support the body off the ground or surface on which the device is positioned to allow the striker to extend from the body to impact the ground/surface. In a particular embodiment, the body may simply rest on the ground with the striker impacting the ground in an extended position. However, in most embodiments, the leg or legs elevate the body and the striker(s) connected to the body. The legs may be any structure capable of supporting a weight of the device. In a particular embodiment, the legs may have an ability to adjust in length. For example, the legs may telescope or may be formed of two or more parts which are adjustable relative to one another. This may allow a height of the body to be adjusted relative to the ground or surface on which the device is resting.

In one embodiment, the legs may be pivotable, such as by a hinged connection, to fold between a stowed position and an extended position. In a one embodiment, the leg may terminate in a tapered shape or spike, allowing this portion to be driven into the ground. In a further embodiment this taper/spike may be pivotably attached to the leg, allowing it to be extended or stowed. In another embodiment, the leg may define an aperture at its distal end which allows a spike or anchor to be passed through. In one embodiment, the device may have three legs, allowing it to form a tripod arrangement. In another embodiment, the device may have four legs, one at each corner of a rectangular body.

The striker of the noise-making device may be any structure capable of contacting the ground to create a noise. Typically the striker may be formed having a rounded or flat head. In one embodiment, the striker may be spherical. In another embodiment, the striker may be conical. In yet another embodiment, the striker may be hoof-shaped. The striker is durable enough to be impacted into a hard or uneven ground surface repeatedly. In most embodiments, the striker is movable between a retracted or resting position and an extended position where it can (or, depending on configuration, is configured to) impact the ground or surface on which the device is resting. Upon impact, a noise is created that can mimic or simulate a noise of an animal's steps. Typically, the striker is connected to a movement structure by a shaft, string, arm, or the like.

The device, in most embodiments, can be automated by way of a motor such as an electric motor or any other drive structure. The motor is configured to provide motion of the striker or strikers between the retracted and extended positions. As noted, mechanical structures such as wind-up devices may also be used without straying from the scope of the present invention. Typically, the striker motion is a reciprocating motion allowing for repeated "stomping" noises to be created by the device. In one embodiment, the motor may be programmed to operate the striker(s) in varied ways and at uneven intervals, making the noise created more closely mimic a real animal.

In a further embodiments, the device may be controllable by a remote controller in communication with the device such as a wireless remote. In one embodiment, the controller may be a wireless controller. The controller may communicate via a transmitter/transceiver to a corresponding receiver/transceiver of the device. The receiver/transceiver of the device may then provide a signal to the motor or other component to control the device. In one embodiment, the remote controller may be a cellular phone or other wireless computing device. This control may include simple on/off control, as well as specific programmed operations, and/or control of additional optional features of the device. The remote controller may be any type of controller capable of communication with the device. In one embodiment, the controller may be a hand-held controller connectable to a body or the like by a strap. In another embodiment, the controller may be arm or wrist mounted, to allow a user to quickly and easily access it while in the remote position. In other embodiments, a wired controller, or buttons/control input directly on the noise-making device may be used, without straying from the scope of the present invention.

The noise-making device is designed to be carried into remote locations and therefore, in many embodiments, has one or more carrying features to aid in its transportation. Examples of carrying features include, but are not limited to, handles, such as integrated, retractable, or removable handles, as well as straps, such as a shoulder strap, backpack straps, and the like. It should be understood that any carrying feature may be used, alone or in combination, without straying from the scope of the present invention. In further embodiments, a travel pack such as a case, bag, padded bag, or the like may contain the device for carrying and/or movement.

The noise-making device and its various components may be formed from any materials capable of supporting the device and providing an impact force to the ground to create noises. These may vary and different materials may be used for different components. Examples of materials of which the noise-making device may be made include, but are not limited to plastics, metals, composite materials, wood, stone, synthetic materials, and the like.

The noise-making device may, in varying embodiments, contain one or more of any of the following varied features. While listed as individual embodiments, it should be understood that the different embodiments, and components thereof, may be used in combination with other embodiments and features without straying from the scope of the present invention. The listing of features and embodiments herein are, in many cases, intended to be used together or in various combinations, and are not limited to standalone embodiments.

In one embodiment, the noise-making device may have a scent source connected to the body. Typically the scent source may be on or within the body of the device. Such a scent source may be a tray for a scent pad, in one embodiment. In other embodiments, the scent source may be any other scent delivery or storage system. In a particular embodiment, the tray may double as a multi-use tray, and need not be limited in scope to the scent pad.

In a further embodiment, the noise-making device may have a movement decoy which may extend from the body to move in a way to attract an animal. Movement may be achieved by the same or a separate drive structure that is used by the striker(s). This may be a movement to mimic an animal similar to the desired animal, or, for attracting predators, may be a movement to mimic a prey. In another embodiment, the movement decoy may be a moving structure to create noise such as a rattling noise. In a particular embodiment, the noise-making device may be integrated into a deer decoy. This decoy may be a standard decoy, or may be custom designed to operate with the noise-making device. In another particular embodiment, the noise-making device may be used in conjunction with a deer decoy.

In one embodiment, the noise-making device may have an ozonics system for ozone-generator based scent control and elimination.

In some battery powered embodiments, the device may include a power output to allow the batteries to power other battery powered devices. Such a power output may be a wall-outlet style socket, a USB socket, a vehicle-style cigarette lighter socket, and the like.

In yet another embodiment, a cover, drape, or skirt may be utilized to cover all or part of the body and/or legs. The cover may hide the movement of the strikers striking the ground, and/or may provide a camouflage for all or part of the device. The cover may be formed of a camouflage patterned material, among other designs. Depending on use location, the camouflage may vary. For example in a snowy terrain a white camouflage may be used, while in a wooded terrain a wooded camouflage may be used. In a certain embodiment, the cover may have hook-and-loop connector strips which allow it to be attached and removed from the device, though any other connection options are within the scope of this invention.

In still another embodiment, the body may have a built-in storage compartment. The compartment may be of any shape and size to allow storage of small to medium sized items. The compartment may be closable by a closure, and in some embodiments lockable. Typically, a gasket or similar structure may be employed to make the storage compartment weather-tight.

The noise-making device may be equipped with a global positioning system ("GPS") to allow for its tracking and retrieval. In a particular embodiment, a remote computing device, such as a smart phone or the like, may be interfaced with the GPS locator. The location of the device may be superimposed on a map and be displayed on the smart phone along with the location of the phone itself. A user may then use this layout to locate the noise-making device. Other tracking features may be used in different embodiments, such as an alarm or other noise-based tracker, or a flashing beacon.

The noise-making device may include a first-aid kit which may be handy to those in outdoors situations. The first-aid kit may be attached to an exterior of the body or may be integrated into a compartment defined by the body, such as the storage compartment noted above. In a similar embodiment, the noise-making device may include a flashlight which may be attached to an exterior of the body or may be stored in a storage compartment. In another similar embodiment, the noise-making device may include a compass which may be attached to an exterior of the body or may be stored in a storage compartment.

The noise-making device may include a motive source such as wheels, track, crawling legs, and the like. The motive source may allow the device to be remotely controlled to ease placement of the device. In such an embodiment, the motive source may also act as the "legs" described herein to elevate the body off the ground or surface.

Turning now to FIG. 1, a perspective embodiment of the noise-making device is provided. In this view, the device has body 10, which is supported by legs 11. A striker 12 is formed as an impact head. Connector 13 (such as a string, shaft, or elongate element) joins striker 12 to the device's movement structure. The striker 12 is in the extended position to extend to a point at or beyond the distal end of the legs. An aperture (not shown) allows a proximal end of the connector (not shown) to connect directly or indirectly to a motor (not shown) within the body. The motor allows the striker to move between a retracted position with the striker 12 withdrawn above the distal end of the legs 11, and the extended position with the striker 12 at or beyond the distal end of the legs 11. As can be seen, the striker 12 can move between the extended position to strike the ground, shown in the solid lines, and retracted position housed within the body 10, as shown in broken lines and indicated by arrow. The body 10 has an opening allowing the striker 12 to move between the retracted and extended position to impact the ground.

Further, in this embodiment, a number of optional accessories are provided on the body 10. A speaker 15 is connected to the body 10 which may be used to sound animal calls, rattling sounds, among other sounds. This speaker may be in wireless communication with a mobile controller such as a cellular telephone ("smartphone") in some embodiments, allowing the speaker to be used for both animal call noises, as well as music and other common speaker use. A camera 16 is connected to the body 10 to allow photograph and/or video recording. In various embodiments, the camera may record video, take photographs, and stream video and/or photographs, or may perform any or all of the above. A scent tray 14 is positioned on a top of the body 10 to receive a liquid or solid scent material or scent pad to attract a desired animal.

Figure 2:
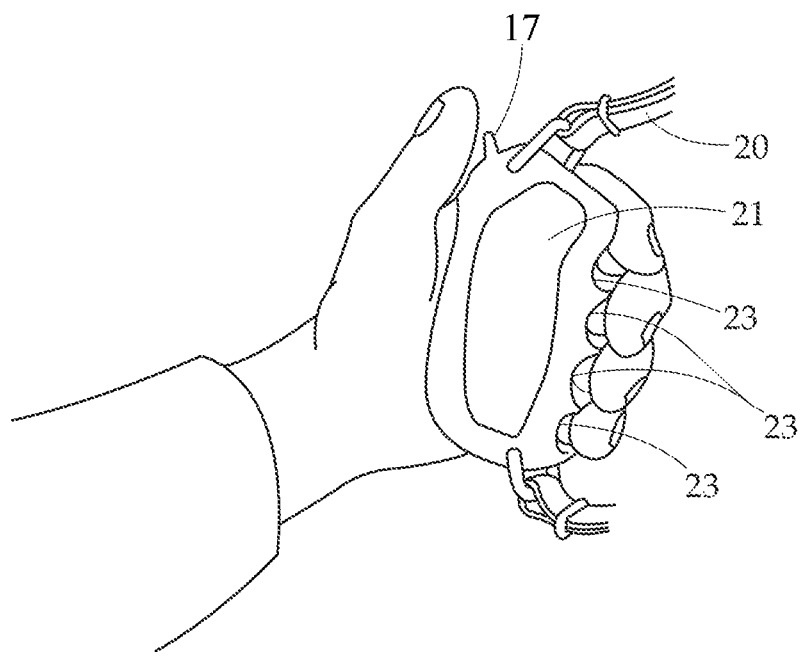
FIG. 2 provides a view of an embodiment of a controller.

FIG. 2 provides an embodiment of a controller which is remote from the noise-making device. In this embodiment, the controller 21 is in wireless communication with the device, such as that of FIG. 1. A strap 20 allows the controller 21 to be connected to a convenient location, such as securely connected to a body or equipment of the user, nearby trees or a stand, and the like. In this embodiment, the controller has a plurality of buttons 17, 23. In a particular embodiment, the buttons may light up, or be coated with a glow-in-the-dark coating. These may be programmed (either pre-programmed, programmable and/or reprogrammable) to control various aspects of the device. In one embodiment, the different buttons may control operation of the strikers, such as speed, impact force, impact pattern, impact type, and the like. In another controller embodiment, rocker switches may be used instead of buttons. Further in some embodiments, the controller may be wrist mounted or forearm mounted. In other embodiments, the controller may be mounted to a firearm or hunting bow. It should be understood that the controller may be connected or mounted anywhere without straying from the scope of the present invention.

Figure 3:
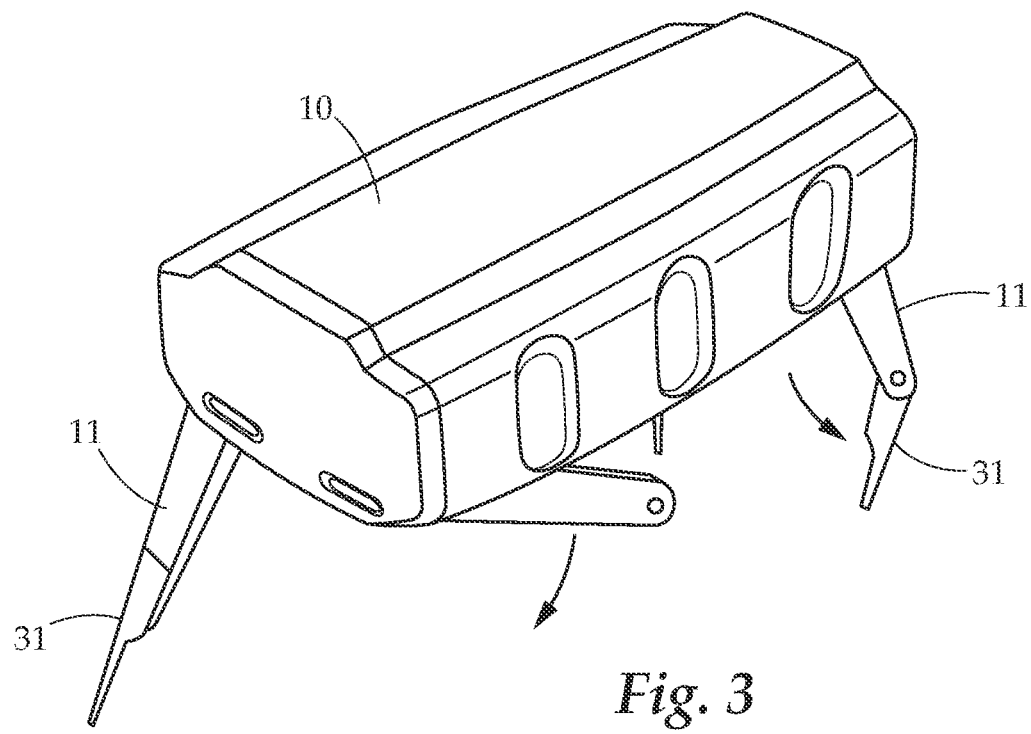
FIG. 3 provides a perspective view of another embodiment of the present invention.

FIG. 3 provides a view of another embodiment of the noise-making device. In this view, the legs 11 have a foldable extension formed as a tapered spike 31. In some embodiments, this spike may be integrated as part of the leg 11, though in this embodiment, the spike is hinged to the leg 11 allowing it to be folded out when needed, and folded in when not desired and/or when the device is not in use. This configuration allows the device to be secured to the ground so that the impacts or other contacting of the strikers (not shown) on the ground do not cause unwanted movement of the body 10.

Figure 4:
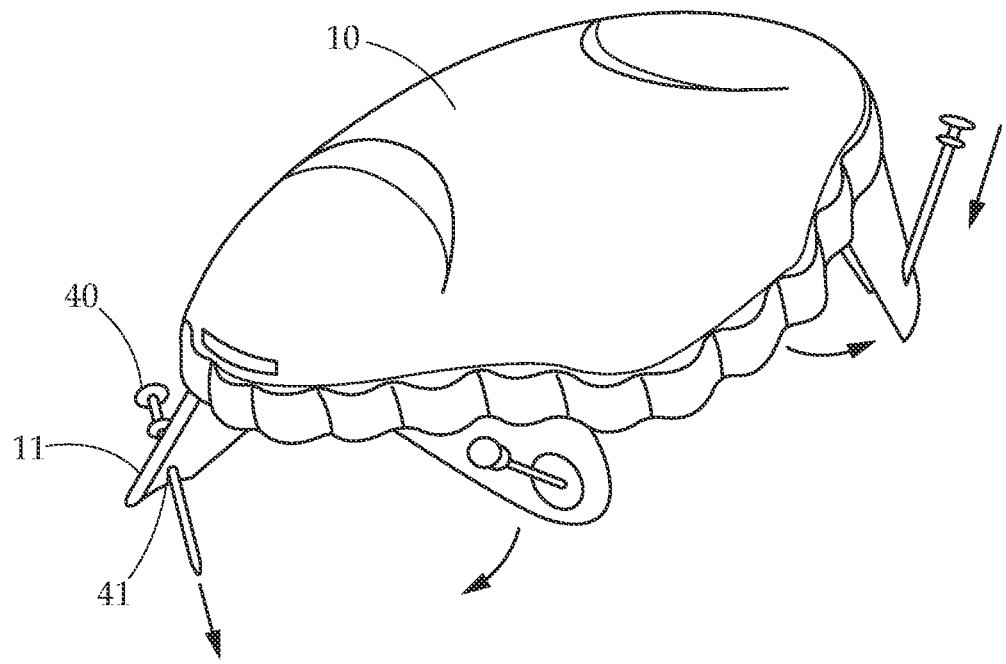
FIG. 4 provides a perspective view of yet another embodiment of the present invention.

FIG. 4 provides a view of another embodiment of the noise-making device. In this view, body 10 is slightly different from FIGS. 1 and 3. In this embodiment, legs 11 define an opening or aperture 41 through which a spike 40 may be passed. This configuration allows the device to be secured to the ground so that the impacts or other contacting of the strikers (not shown) on the ground do not cause unwanted movement of the body 10.

Figure 5:
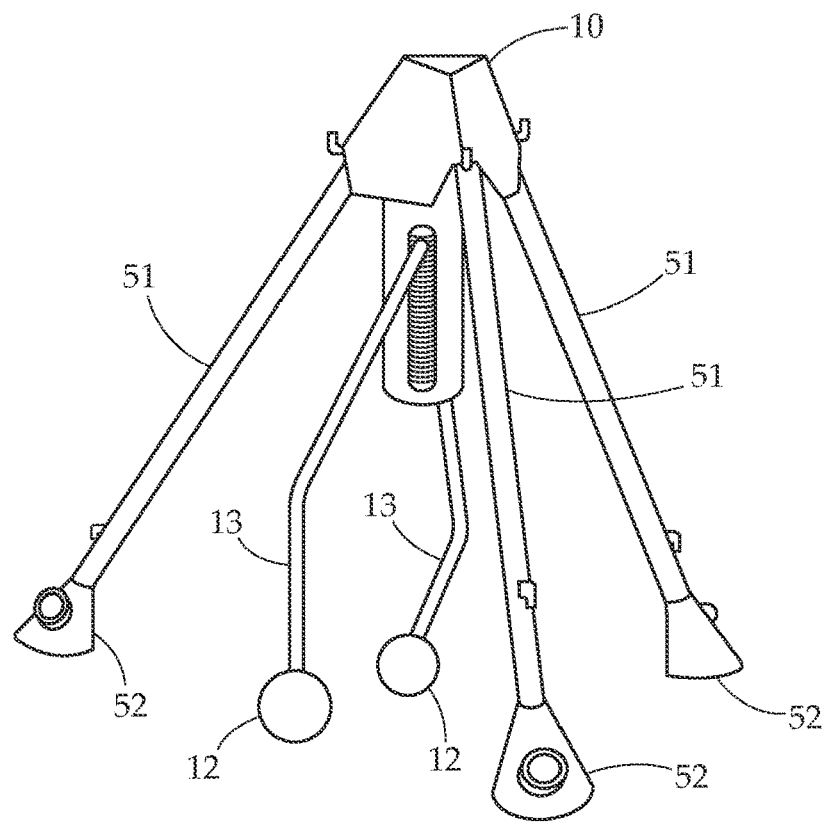
FIG. 5 provides a perspective view of still another embodiment of the present invention.
Figure 6:
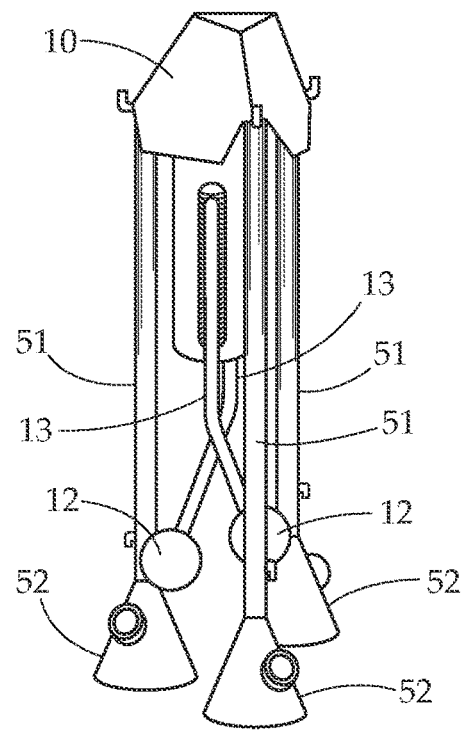
FIG. 6 provides a perspective view of still another embodiment of the present invention.

FIGS. 5 and 6 provide a view of the noise-making device configured as a tripod arrangement. In this view, the body 10 provides support but does not necessarily house or contain the operational elements such as the drive motor (not shown), strikers 12, 13, and the like. Such a configuration of the body 10 is not limited to tripod versions, and may be used in any arrangement of the device. Arms 51 are seen here to be foldable between extended positions (FIG. 5) and stowed positions (FIG. 6) by pivoting about the body 10. Feet 52 of the body define apertures through which spikes may pass, such as configured in FIG. 4.

FIGS. 7A-7B show a view of an embodiment of the operation of the striker. In this view, a motor driven shaft 70 is connected to a rotational motor (not shown). The strikers 12 are formed as weighted objects, such as small sand or weight-filled bags, plastic or metal balls, or other objects, and are connected to the shaft 70 by a string or cable connector 71. Upon rotation of the shaft 70, the strikers 12 swing around the shaft and impact the ground 73 or impact surface at an extended position. At other points of rotation, the strikers are in the retracted position. Various speeds of rotation of the shaft 70 in forward and reverse may create a variety of thumping and rustling sounds. Further, different lengths of connector may cause different noises. For example, a longer connector 71 may cause a dragging noise, while shorter connectors 71 may result in a more short, impacting noise.

FIGS. 8A-8B show another view of an embodiment of operation of the striker. In this embodiment, striker 12 is lifted up and dropped downward by the force of gravity. An elongate arm 83 is connected to the striker 12. The arm 83 has teeth 82 on its surface at a portion of its length. Teeth 82 engage with corresponding teeth 81 of a gear 80. On part of the gear 80 is a non-toothed smooth portion 84, which does not engage with the teeth 82 of the arm 84. In operation, when the gear 80 rotates, such as shown by the arrows, teeth 81 engage teeth 82, lifting up the striker 12. When the rotation of the gear 80 reaches the smooth portion 84, the arm 82 and falls by gravity, causing the striker 12 to impact the ground. In further embodiments, a spring or other force device may be used to drive the arm downward with force additional to gravity. This, in some cases, may save weight of the device to aid in its portability.

Figure 9A:
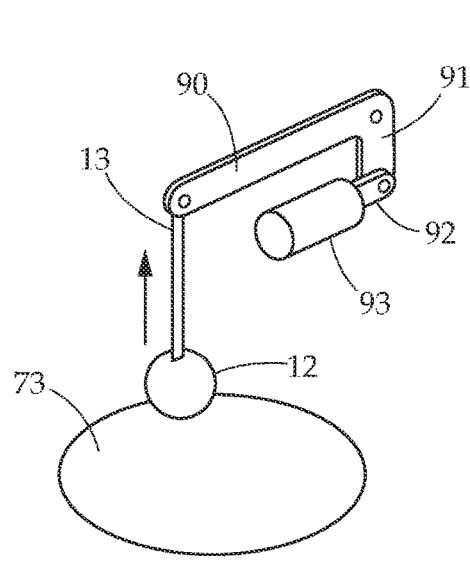
FIG. 9A provides a view of yet another embodiment of striker operation of the present invention.
Figure 9B:
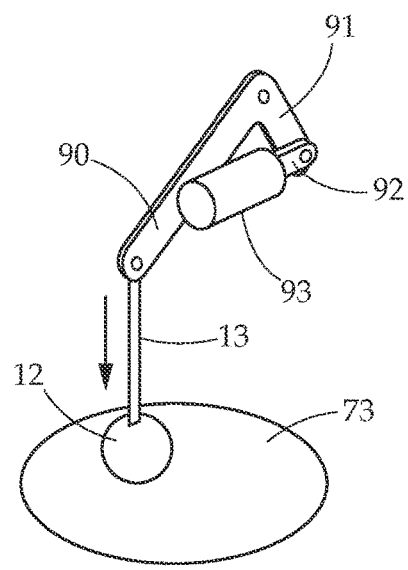
FIG. 9B provides a view of yet another embodiment of striker operation of the present invention.

FIGS. 9A-9B show another view of an embodiment of operation of the striker. In this view, a linear motor 93 is used to move a drive a piston 92 connected to a right angle lever 90 pivotable at its bend 91. A striker 12 is connected to the distal end of the right angle lever 90 by a connector 13, which may be a shaft, string, cable, and the like. As the linear motor 93 causes the piston 92 to extend, it causes the right angle lever 90 to pivot about 91 and move its end downward (FIG. 9B) bringing the striker 12 to the extended position. When the piston 92 is retracted, the striker 12 is in turn in the retracted position.

Figure 10A:
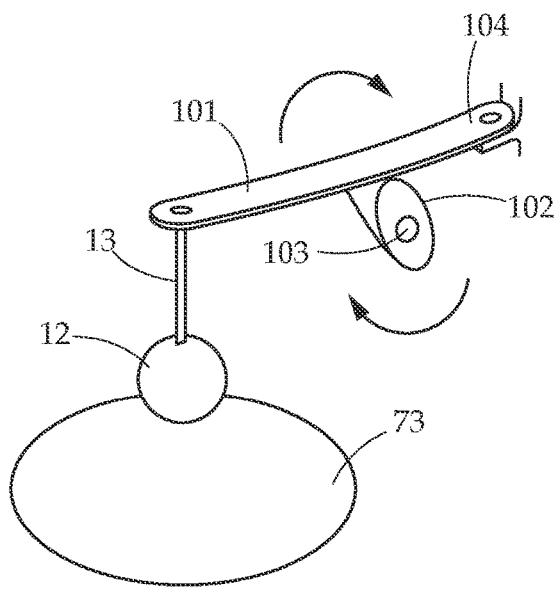
FIG. 10A provides a view of still yet another embodiment of striker operation of the present invention.
Figure 10B:
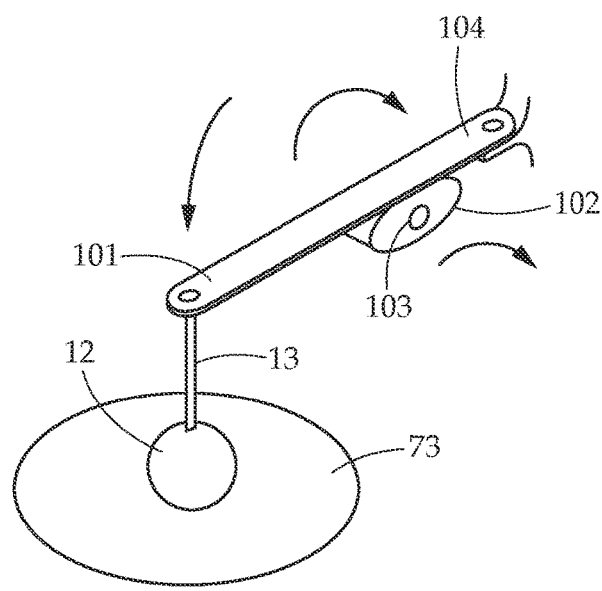
FIG. 10B provides a view of still yet another embodiment of striker operation of the present invention.

FIGS. 10A-10B show another view of an embodiment of operation of the striker. In this view, a rotational motor shaft 103 is connected to a cam rod 102. A strip 101 such as a spring steel strip is secured at one end 104 and has the striker 12 connected to it at an opposite end by connector 13. Upon rotation of the cam, the striker is lifted to the retracted position when the cam rod's 102 major axis is abutting the bottom of the strip 101 (FIG. 10A). A lever system may be used to reverse the relationship between the cam rod 102 rotational position and the striker 12 position. When the minor axis of the cam rod 102 is abutting the bottom of the strip 101, striker 12 falls downwardly, impacting the ground. Various rotational speeds and patterns will thus cause varied sounds.

Figure 11A:
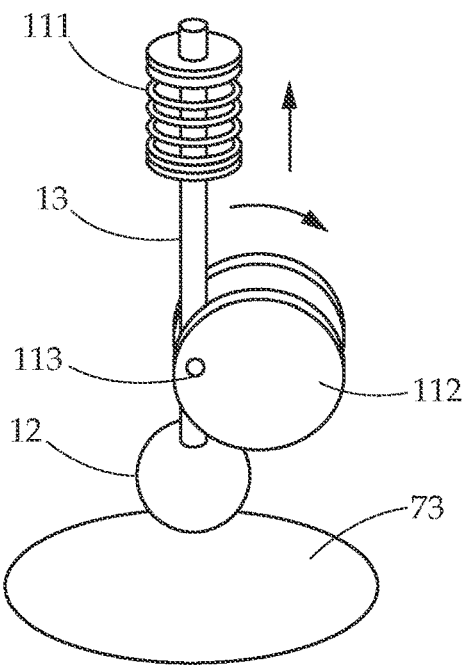
FIG. 11A provides a view of still another embodiment of striker operation of the present invention.
Figure 11B:
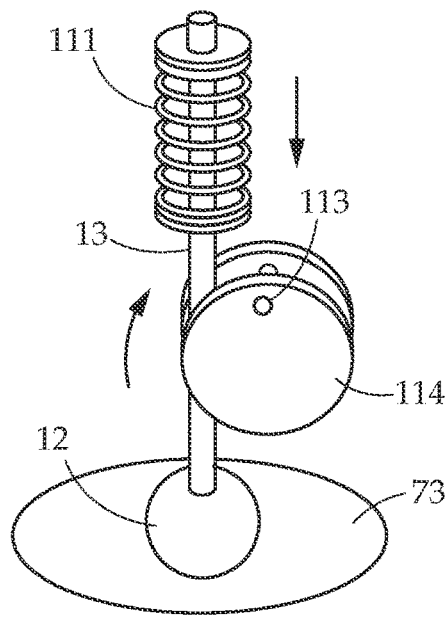
FIG. 11B provides a view of still another embodiment of striker operation of the present invention.

FIGS. 11A-11B show another view of an embodiment of operation of the striker. In this embodiment, a linear mounted rod 13 has a spring mount 111 at one end and the striker 12 at the other end. A rotational lifter 112 engages with the shaft 13 at engagement 113, which may be a protrusion, tab, or the like, lifting rod 13 and compressing spring 111. Once the rotation causes the engagement 113 to disengage from the shaft, the striker 12 falls to the ground as gravity and spring force drive it downward. It should be noted that in any embodiment, a spring or other force providing device such as an elastic, membrane, piston, or the like, may be used to act on the striker and related structure when in the retracted position to urge it to the extended position. The rotational lifter, 112, as shown, is formed of spaced apart discs which do not engage with the rod 13 except at the engagement 113.

Figure 12A:
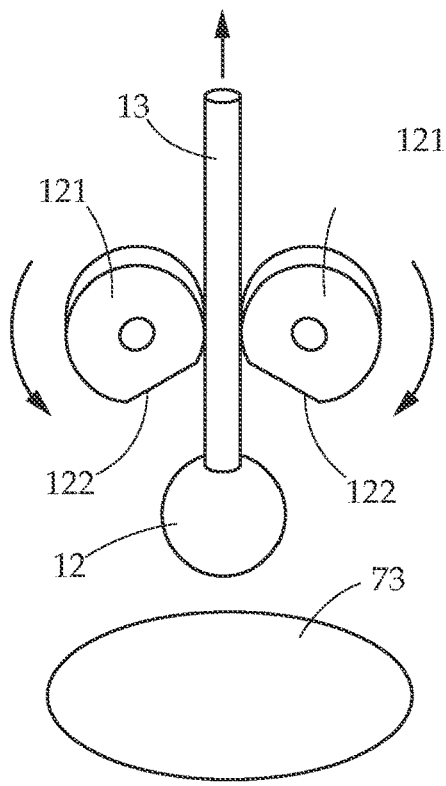
FIG. 12A provides a view of another embodiment of striker operation of the present invention.
Figure 12B:
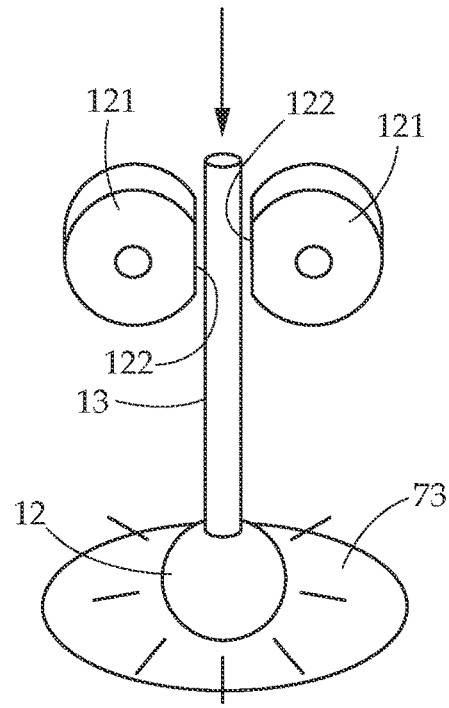
FIG. 12B provides a view of another embodiment of striker operation of the present invention.

FIGS. 12A-12B show another view of an embodiment of operation of the striker. In this view, two D-shaped wheels 121 engage a rod 13. The D-shaped wheels 121 may be formed of a high-friction, gripping material, such as rubber or plastic, among other materials. As the wheels rotate to the flat side (FIG. 12B) the shaft 13, having the striker 12 at its end, drops the striker to the extended position and causes an impact noise. The wheels continue to rotate and re-engage shaft 13, drawing it upward and drawing the striker 12 to the retracted position (FIG. 12A). In a particular embodiment, an additional force device, such as an elastic, spring, or piston, or others as noted herein, which can be present in any embodiment, may be used to increase the force applied to the shaft 13, and in turn the force applied by the striker 12 to the ground 73.

Figure 13:
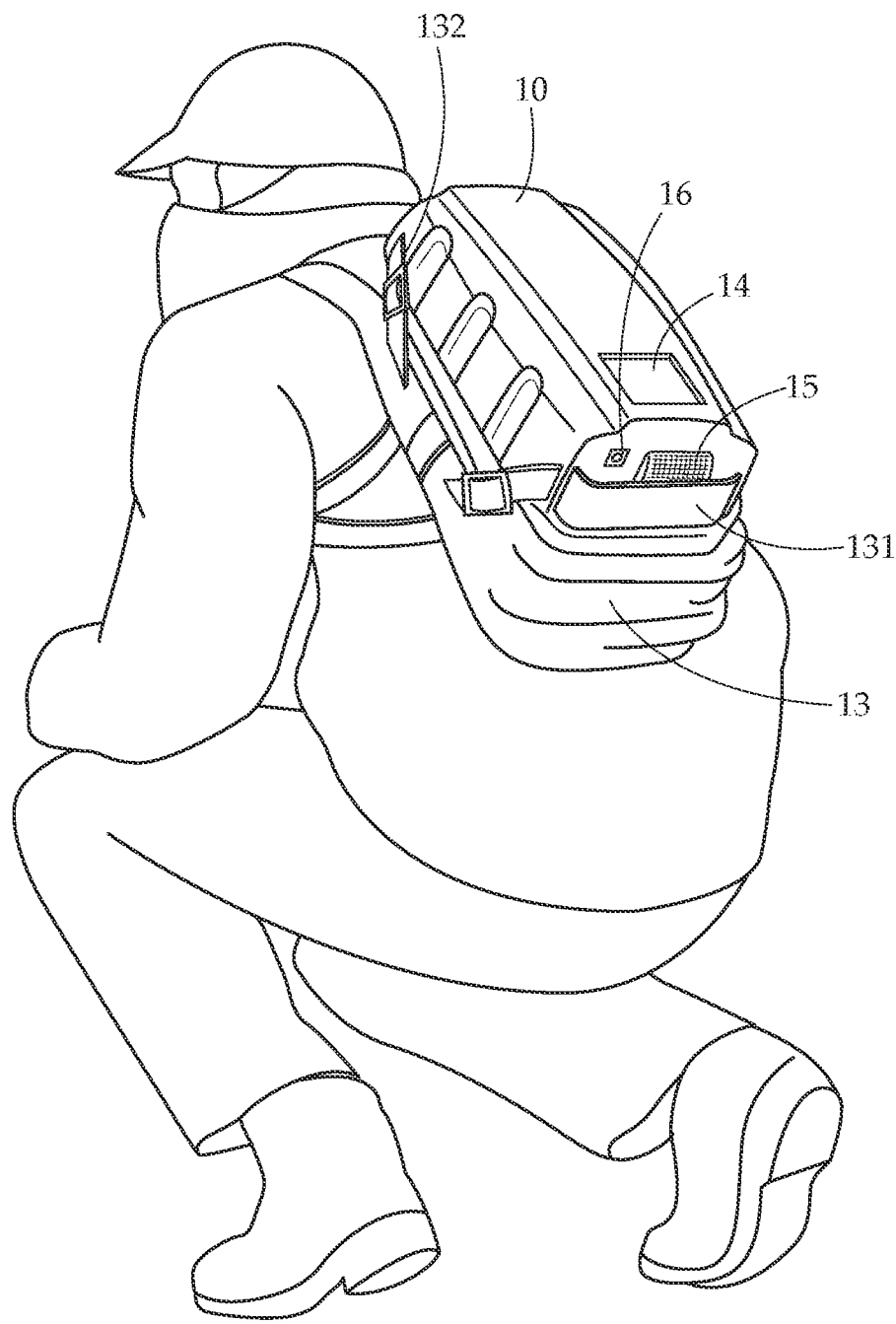
FIG. 13 provides a view of a view of an embodiment the present invention being carried by a user.

FIG. 13 provides a perspective view of an embodiment of the noise-making device being carried in a backpack mode. In this view, carry strap 131 is connected to the body 10. The strap extends to a side strap 132 which is a shoulder strap similar to that of a backpack. The shoulder strap, and another on the opposite side (not shown) extend around a user's shoulder, allowing convenient carrying of the noise-making device. Also visible in this embodiment is skirt 133, which may be act to cover the legs and strikers when the device in use. Skirt 133 may also double as a carrying case.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A noise-making device comprising:
a body;
a plurality of legs depending from the body;
a striker configured to impact a surface on which the legs are on, the striker movable between a retracted position and an extended position to impact the surface that the legs are on, a movement of the striker controlled by a motor; and
wherein the body defines an opening through which the striker passes when moving between the retracted position and the extended position, the striker fully within the body in the retracted position.

2. The noise-making device of claim 1 further comprising a remote controller in communication with the device and operable to activate the motor.

3. The noise-making device of claim 1 wherein the motor is a rotational motor.

4. The noise-making device of claim 1 wherein the motor is a linear motor.

5. The noise-making device of claim 1 wherein the motor is operable at a first speed and a second speed faster than the first speed.

6. The noise-making device of claim 1 wherein the plurality of legs are each foldable with respect to the body.

7. The noise-making device of claim 1 further comprising at least one shoulder strap connected to the body.

8. The noise-making device of claim 1 further comprising a speaker.

9. The noise-making device of claim 1 further comprising a tray arranged horizontally on the body, the tray having a raised edge.

10. The noise-making device of claim 1 further comprising a camera.

11. The noise-making device of claim 3 further comprising an elongate arm, the striker connected to a distal end of the arm, a plurality of teeth formed along a portion of a length of the elongate arm, and wherein a gear is connected to an output of the motor, the gear having a toothed portion about a part of a circumference, and a smooth portion along a remainder of the circumference, the toothed portion of the gear engageable with the teeth of the elongate arm.

12. The noise-making device of claim 4 wherein the striker is connected to a distal end of a right angle lever, an extension and retraction of the linear motor causes the distal end to move upwards and downwards, moving the striker between the extended and retracted position.

13. The noise-making device of claim 3 wherein a cam rod is connected to a rotational output of the motor, the rod being in contact with a strip, the strip having the striker connected to a distal end, such that upon rotation of the cam rod, the striker is moved between the extended and retracted positions.

14. A noise-making system comprising:
a noise-making device comprising:
a body;
a plurality of legs depending from the body;
a striker, the striker configured to impact a surface on which the legs are on, the striker movable between a retracted position above a distal end of the legs, and an extended position at or beyond the distal end of the legs,
a movement of the striker controlled by a motor; wherein the body defines an opening through which the striker passes when moving between the retracted position and the extended position, the striker fully within the body in the retracted position; and a remote controller in communication with the device and operable to activate the motor.

15. The noise-making device of claim 14 wherein the motor is one of a rotational motor and a linear motor.

16. The noise-making device of claim 14 comprising three legs.

17. The noise-making device of claim 14 comprising four legs.

18. The noise-making device of claim 14 wherein the motor is operable at a first speed and a second speed faster than the first speed.

* * * * *